US009946994B2

(12) United States Patent
Singh et al.

(10) Patent No.: US 9,946,994 B2
(45) Date of Patent: Apr. 17, 2018

(54) TECHNIQUES FOR PROVIDING INSIGHTS RELATING TO JOB POSTINGS

(71) Applicant: Microsoft Technology Licensing, LLC, Redmond, WA (US)

(72) Inventors: Satpreet Harcharan Singh, Mountain View, CA (US); Nikita Igorevych Lytkin, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 821 days.

(21) Appl. No.: 14/485,583

(22) Filed: Sep. 12, 2014

(65) Prior Publication Data

US 2015/0347973 A1 Dec. 3, 2015

Related U.S. Application Data

(60) Provisional application No. 62/005,849, filed on May 30, 2014.

(51) Int. Cl.
*G06Q 10/00* (2012.01)
*G06Q 10/10* (2012.01)
*G06Q 50/00* (2012.01)
*G06F 17/30* (2006.01)
*G06Q 30/02* (2012.01)

(52) U.S. Cl.
CPC ......... *G06Q 10/1053* (2013.01); *G06Q 50/01* (2013.01); *G06F 17/30011* (2013.01); *G06F 17/30699* (2013.01); *G06F 17/30867* (2013.01); *G06Q 30/0269* (2013.01)

(58) Field of Classification Search
CPC combination set(s) only.
See application file for complete search history.

(56) References Cited

U.S. PATENT DOCUMENTS 8,631,006 B1 * 1/2014 Haveliwala ....... G06F 17/30867 707/722
2004/0215793 A1 * 10/2004 Ryan ..................... G06Q 50/01 709/229

(Continued)

OTHER PUBLICATIONS

Job seekers using 'cheep' ads' Anonymous. The Courier—Mail; Brisbane, Qld. [Brisbane, Qld] Mar. 28, 2009: 24.*

*Primary Examiner* — Gabrielle A McCormick
(74) *Attorney, Agent, or Firm* — Schwegman Lundberg & Woessner, P.A.

(57) ABSTRACT

A method is disclosed for supplementing information that is to be presented to a user of a social-networking system with respect to a job posting. A request for a job posting stored in a database of a job hosting service is received from a client-computing device. The job posting is for a job opening of an employer and the request is associated with a first member of a social networking service. A snippet of a member profile of a second member of the social networking service is selected for presentation with the job posting. The snippet is extracted from the member profile based on an identification of a correspondence between information specified in the member profile and information specified in the job posting. Responsive to the request, the snippet is communicated to the client-computing device for presentation to the first member in conjunction with the job description.

20 Claims, 9 Drawing Sheets

(56) References Cited

U.S. PATENT DOCUMENTS

| | | | |
|---|---|---|---|
| 2012/0095931 A1* | 4/2012 | Gurion | G06Q 10/00 705/319 |
| 2014/0136434 A1* | 5/2014 | Posse | G06Q 50/01 705/319 |
| 2014/0188899 A1* | 7/2014 | Whitnah | G06F 17/30646 707/749 |

* cited by examiner

FIG. 5

Profile Insights strong cross team relationships between adCenter and both internal and external teams.
– program manager - technologynet (US)

Global CPE Pack. Partner with stakeholders and development teams to implement globalized Excal-based reporting solution * Gap analysis and problem resolution, manage
– program manager - NetworkComp (US)

Click to see full profile

Defined design principles across all Bing apps on Windows 8.1 and Windows Phone 8 around first time experience and user education. Led
– program manager - Microsoft (US)

Release Manager, developed and drove the project plans to ship the Windows SDK for Windows 7, Windows SDK for Server
– program manager - Microsoft (US)

TECHNIQUES FOR PROVIDING INSIGHTS RELATING TO JOB POSTINGS

RELATED APPLICATIONS

This application claims the benefit of U.S. Provisional Application No. 62/005,849, filed May 30, 2014, which is incorporated herein by reference in its entirety.

TECHNICAL FIELD

This application relates generally to the technical field of data processing methods and systems. More specifically, this application relates to techniques for identifying and presenting, with an online job posting, information extracted from one or more member profiles of members of a social networking service, thereby providing the viewer of the job posting with some insightful, contextual information to benefit the viewer's assessment of the job posting.

BACKGROUND

Historically, job seekers—those who are actively seeking job opportunities—have learned about available job openings by word of mouth, or by reading job advertisements printed in a special section of a local newspaper (e.g., help wanted and classified ads). However, in more recent times, job seekers turn to the Internet and a wide variety of job hosting services. A typical job hosting service provides its users with the ability to search for and/or browse online job postings—the modern day equivalent of a help wanted or job-related classified ad. An online job posting generally provides information about a particular job opening, including the employer (e.g., a company) and location at which the job opening is available, an overview of the job responsibilities, minimum and/or desired qualifications an applicant should have to be considered for the job opening, and so forth. Although a typical online job posting provides significantly more information than a traditional help wanted or job-related classified ad, in many instances the viewer of a job posting may desire additional information in order to assess the job posting.

BRIEF DESCRIPTION OF THE DRAWINGS

Some embodiments are illustrated by way of example and not limitation in the figures of the accompanying drawings in which:

FIG. 5 is a line drawing illustrating an example user interface that may be presented to the member;

FIG. 6A is a line drawing illustrating an additional example user interface that may be presented to the member;

FIG. 6B is a line drawing illustrating an additional example user interface that may be presented to the user;

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without each and every specific detail set forth herein. Further, to avoid obscuring the inventive concepts in unnecessary detail, well-known instruction instances, protocols, structures, and techniques have not been shown in detail.

In various embodiments, a method is disclosed for supplementing information that is to be presented to a user of a social-networking system with respect to a job posting. A request for a job posting stored in a database of a job hosting service is received from a client-computing device. The job posting is for a job opening of an employer and the request is associated with a first member of a social networking service. A snippet of a member profile of a second member of the social networking service is selected for presentation with the job posting. The snippet is extracted from the member profile based on an identification of a correspondence between information specified in the member profile and information specified in the job posting. Responsive to the request, the snippet is communicated to the client-computing device for presentation to the first member in conjunction with the job description.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

Figure 1:
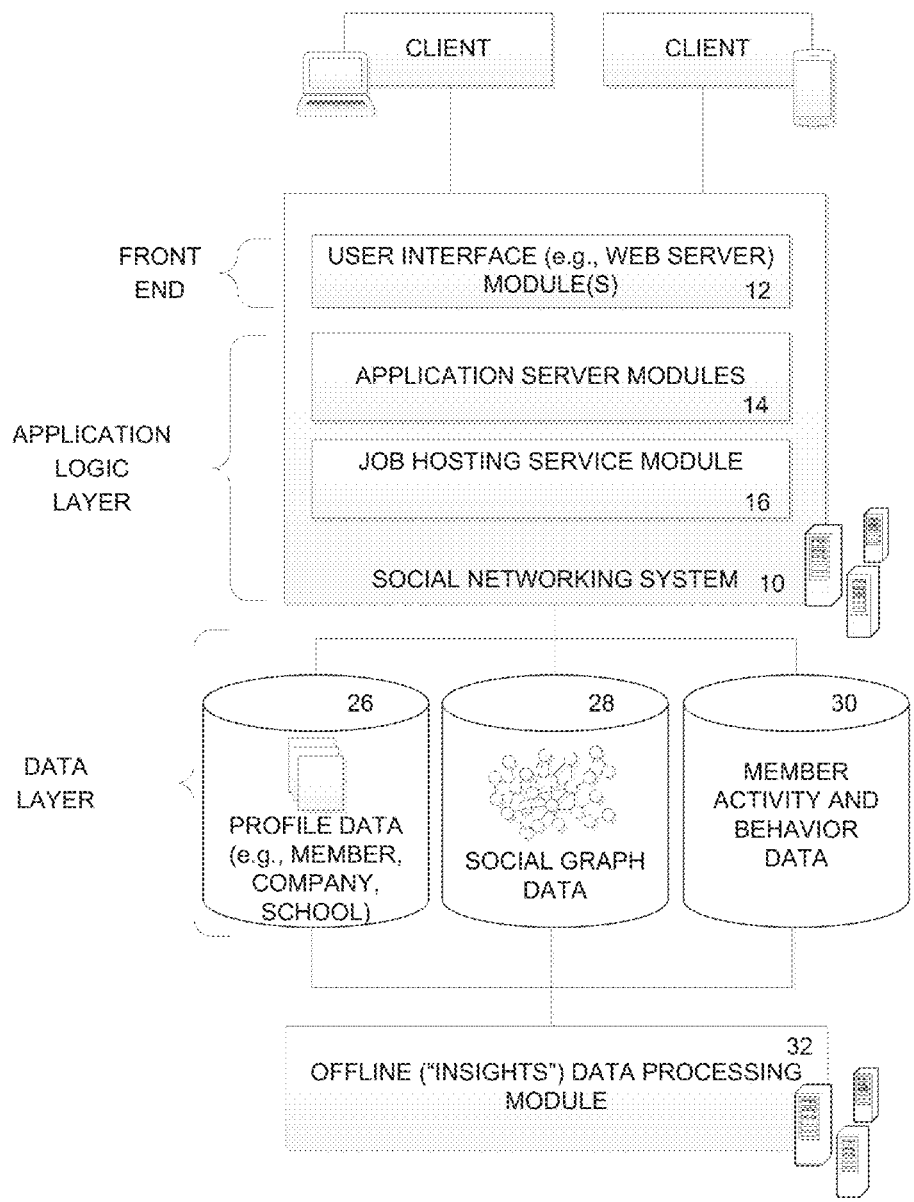
FIG. 1 is a network diagram depicting an example client-server system within which various embodiments may be deployed.

FIG. 1 is a diagram illustrating an example computer network environment in which job hosting service 16 may be implemented, consistent with embodiments of the present invention. As illustrated in FIG. 1, the job hosting service 16 is part of a social networking system 10. The social networking system 10 includes one or more application server modules 14 that provide any number of applications and services that leverage the social graph data 28 maintained by the social networking system 10. For example, the social networking system 10 may provide a photo sharing application, a job posting and browsing service, a question-and-answer service, and so forth. One or more of these applications or services may leverage the job hosting service 16 to allow members of the social networking system 10 to gain insights into job postings from other members of the social networking system 10.

As shown in FIG. 1, the front end consists of a user interface module (e.g., a web server) 12, which receives requests from various client-computing devices, and communicates appropriate responses to the requesting client devices. For example, the user interface module(s) 12 may receive requests in the form of Hypertext Transport Protocol (HTTP) requests, or other web-based, application programming interface (API) requests. The application logic layer includes various application server modules 14, which, in conjunction with the user interface module(s) 12, generate various user interfaces (e.g., web pages) with data retrieved from various data sources in the data layer. With some embodiments, individual application server modules 14 are used to implement the functionality associated with various applications, services and/or features of the social networking service. For instance, a social networking service may provide a broad variety of applications and services, to include the ability to search for and browse member profiles, job listings, and news articles. Additionally, applications and services may allow members to share content with one another, for example, via email, messages, and/or content postings (sometimes referred to as status updates) via a feed. With some embodiments, in addition to providing members with the ability to communicate information via the feed, one or more of the applications and services provided by the social networking system 10 may use the job hosting service 16 to request information pertaining to a job posting, such as snippets from member profiles pertaining to the job posting. The information may then be presented to a member when the member accesses the job posting. A wide variety and number of other applications or services may be made available to members of a social networking service, and will generally be embodied in their own instance of an application server module or modules.

As shown in FIG. 1, the data layer includes several databases, such as a database 26 for storing profile data, including both member profile data as well as profile data for various entities (e.g., companies, schools, and other organizations) represented in the social graph maintained by the social networking service. Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information—generally referred to as member profile information—is stored, for example, in the database with reference number 26. Similarly, when a representative of an organization initially registers the organization with the social networking service, the representative may be prompted to provide certain information about the organization. This information—generally referred to as company or employer profile information—may be stored, for example, in the database with reference number 26 or another database (not shown). With some embodiments, the profile data may be processed (e.g., in the background or offline, by the offline data processing module 32) to generate various derived profile data. For example, if a member has provided information about various job titles the member has held with the same or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another member, the member who is following may receive content postings status updates or other content postings published by the member being followed, or relating to various activities undertaken by the member being followed. Similarly, when a member follows an organization, the member becomes eligible to receive content postings published on behalf of the organization and/or system or service-generated content postings that relate to the organization. For instance, messages or content postings published on behalf of an organization that a member is following will appear in the member's personalized feed. In any case, the various associations and relationships that the members establish with other members, or with other entities and objects, are stored and maintained within the social graph, shown in FIG. 1 with reference number 28.

As members interact with the various applications, services and content made available via the social networking service, the members' behavior (e.g., content viewed, links selected, etc.) may be monitored and information concerning the members' behavior may be stored, for example, as indicated in FIG. 1 by the database with reference number 30. This information may be used to infer a member's intent and/or interests, and to classify the member as being in various categories. For example, if the member performs frequent searches of job listings, thereby exhibiting behavior indicating that the member is a likely job seeker, this information can be used to classify the member as a job seeker. This classification can then be used as a targetable attribute or characteristic for purposes of enabling others to target the member for receiving advertisements, messages or content postings. Accordingly, an employer with available job openings can publish a content posting that is specifically directed to certain members of the social networking service who are likely job seekers, and thus, more likely to be receptive to recruiting efforts.

Figure 2:
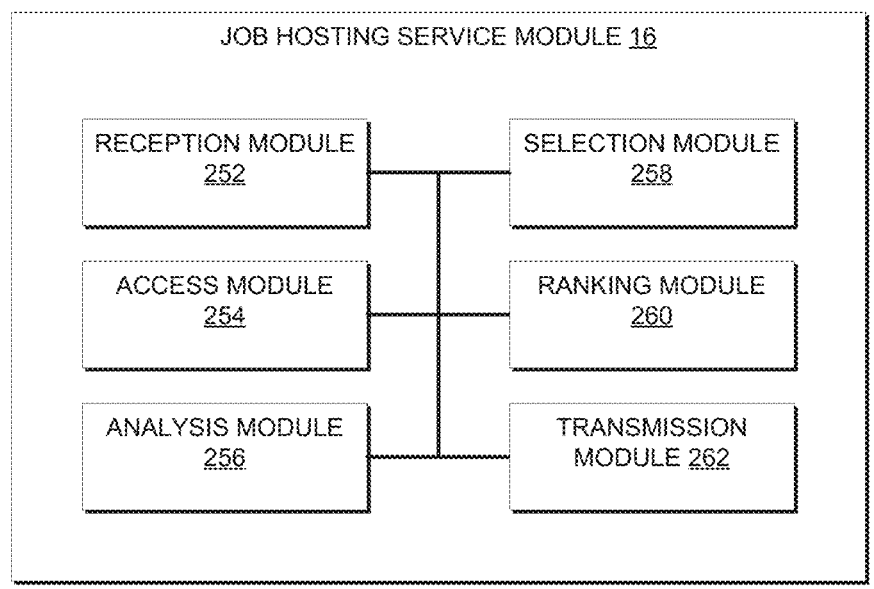
FIG. 2 is a block diagram illustrating example modules of the job hosting service of FIG. 1.

FIG. 2 is a block diagram illustrating example modules of the job hosting service 16 of FIG. 1. A reception module 252 may be configured to receive job postings. Such job posting may be received from various sources, such as a form submitted by a recruiter or other representative of an employer or data ingested by an ingesting module (not shown) that ingests the job postings from external web sites.

An access module 254 may be configured to detect a request by a member of the social-networking system to access a job posting. In response to the detecting of the request, the access module 254 may interact with other modules of the job hosting service 16 to perform actions in response to the receiving of the request.

An analysis module 256 may be configured to analyze member profiles of members of the social-networking system with respect to a job posting. For example, the analysis module 256 may be configured to identify correspondences between information specified in a profile of a member of the social networking system and information specified in a job posting, as is described in more detail below. In various embodiments, the analysis module 256 may be configured to perform at least a portion of the analysis offline (e.g., via the offline data processing module 32). Alternatively, the analysis module 256 may be configured to perform the analysis in real time.

A selection module 258 may be configured to select particular information or data items (e.g., snippets of job descriptions) included in one or more profiles of members of the social networking system for communication for presentation to a member in conjunction with a presentation of the job posting. The snippets may include keywords or phrases from information submitted by other members of the social-networking system with respect to the job, such as keywords or phrases in job descriptions specified in member profiles of members who currently hold or have previously held the job. The selection may be based on various factors, such as a relevance of the information to the job posting, as is described in more detail below.

A transmission module 260 may be configured to communicate information pertaining to a job posting, such as selected snippets of job descriptions pertaining to the job posting, for presentation to a member along with the presentation of the job posting.

Although the functionality corresponding to the various modules is depicted and described as being implemented on one of the client side or the server side, in various embodiments, some or all of the functionality corresponding to modules may be implemented on either the client side, server side, or both. Thus, for example, in various embodiments, one or more algorithms implemented on the client side or server side may utilize information collected about the user on the client or server side, such as the member's current activity, current location, past behavior, social/graph data, profile data, and so on.

Figure 3:
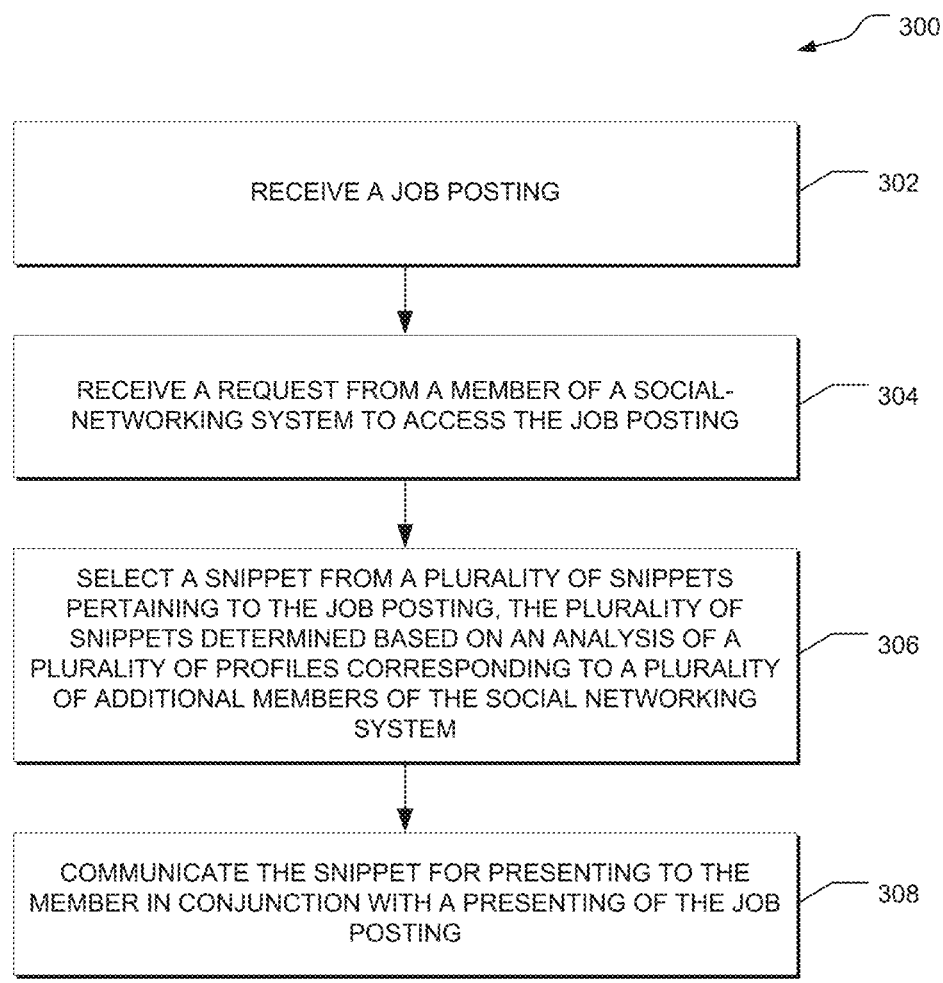
FIG. 3 is a flow chart illustrating example operations of a method of communicating a snippet from a member profile for presentation with a job posting.

FIG. 3 is a flow chart illustrating example operations of a method 300 of communicating a snippet from a member profile for presentation with a job posting. In various embodiments, the method 300 may be implemented by one or more of the modules of job hosting service 16 of FIG. 2.

At operation 302, the server-communication module 252 receives a posting pertaining to a job. The job posting may be received from various sources, such as a form submitted by a representative of an employer (e.g., from a job recruiter) or from a separate module that ingests job posting from external web sites. The job posting may include various data items pertaining to the job, such as a description of the job, a title of the job, requirements or preferences for the job (e.g., desired or preferred skills, experience, or education for the job, and so on), or information about an employer that is hiring for the job (e.g., a name of the company, a location of the company, and so on).

At operation 302, the access module 254 may determine that a member of a social-networking system is interested in the job posting. For example, the access module 254 may analyze behavior of the member with respect to the social-networking system, such as the types of jobs for which the member requests information. For example, if the member clicks on a link to view a job posting, the access module 254 may determine that the member is interested in that job posting or a type of the job posting (e.g., engineering, sales, marketing, management, and so on). Or the access module 254 may determine that a member is interested in a type of a job based on a correspondence between information specified in a profile of the member (e.g., employment history, education, years of experience, etc.) and information specified in a job description provided by a job recruiter (e.g., job requirements) or a correspondence between information specified in the profile of the member and information provided in profiles of other members who are familiar with the type of the job (e.g., based on employment history, education, and so on). In various embodiments, the access module 254 may determine that the member is interested in a job posting based on the member requesting access to it (e.g., by clicking on a link to the job posting that is presented on a web page being, message, or notification served by the social-networking system).

At operation 306, the selection module 258 selects snippets from a plurality of snippets pertaining to the job posting. In various embodiments, the selection module 258 identifies the snippets based on an analysis of a plurality of member profiles corresponding to a plurality of additional members of the social networking system. For example, if the posting is for a job having the title "software engineer," the snippets may be extracted from job descriptions for jobs having the title "software engineer" that were included in the member profiles. In various embodiments, a strength of a correspondence between the job description and each of the member profiles the snippets may be determined. The strength of the correspondence may be based on various factors, such as whether the member profile specifies that the member is currently employed as a software engineer or based on how recently the member profiles specifies that the member was employed as a software engineer. In addition to job title, various other information specified in the job posting and member profiles may be compared to determine the strength of the correspondence, such as the industry of the company that is hiring for the job, salary range, job requirements (e.g., skills, experience, or education), and so on.

In various embodiments, snippet may be selected independently of any specified relationship between the member and each of the set of additional members having profiles from which the second data item is derived. For example, the snippet may be extracted from one of the set of member profile based on rankings of the job descriptions included in each of the member profiles (as described in more detail below).

In various embodiments, the snippet may be selected based at least in part on relationship information pertaining to the member and the additional members. For example, if the posting relates to a software engineering job and the snippet is associated with one of a set of additional members who are currently employed as software engineers, the snippet may be selected based on relationships between the member and each of the set of additional members. Thus, for example, a snippet from a profile of an additional member with whom the member has the closest relationship may be selected above snippets from profiles of other members. In alternative embodiments, the relationships between the member and each of the additional members have no bearing on the selection of the snippet.

In various embodiments, the selection module 258 may select particular keywords or phrases from the data items based on the keywords or phrases having a stronger correlation to the type of the job than other keywords or phrases. The strength of correlation may be determined based on the data items being included in a number of profiles of the other members of the social-networking system that exceeds a threshold (e.g., 50%)%), or using a statistical hypothesis test such as a Chi-squared test. Or the selection module 260 may select a top number or percentage of the data items based on a ranking of how often the data items are specified in the profiles of the other members.

At operation 308, the transmission module 262 communicates the snippet for presentation to the member in conjunction with a presentation of the posting. For example, the member may be presented with the job description in a first region (e.g., a "job description" region) of a user interface and a snippet pertaining to the job posting in a second region (e.g., a member-specific context region) of the user interface (see, e.g., FIG. 6). Thus, for example, while viewing a job posting, the member may also view additional information relevant to the job posting that is derived from other sources, such as profiles of the other members of the social networking system.

Figure 4:
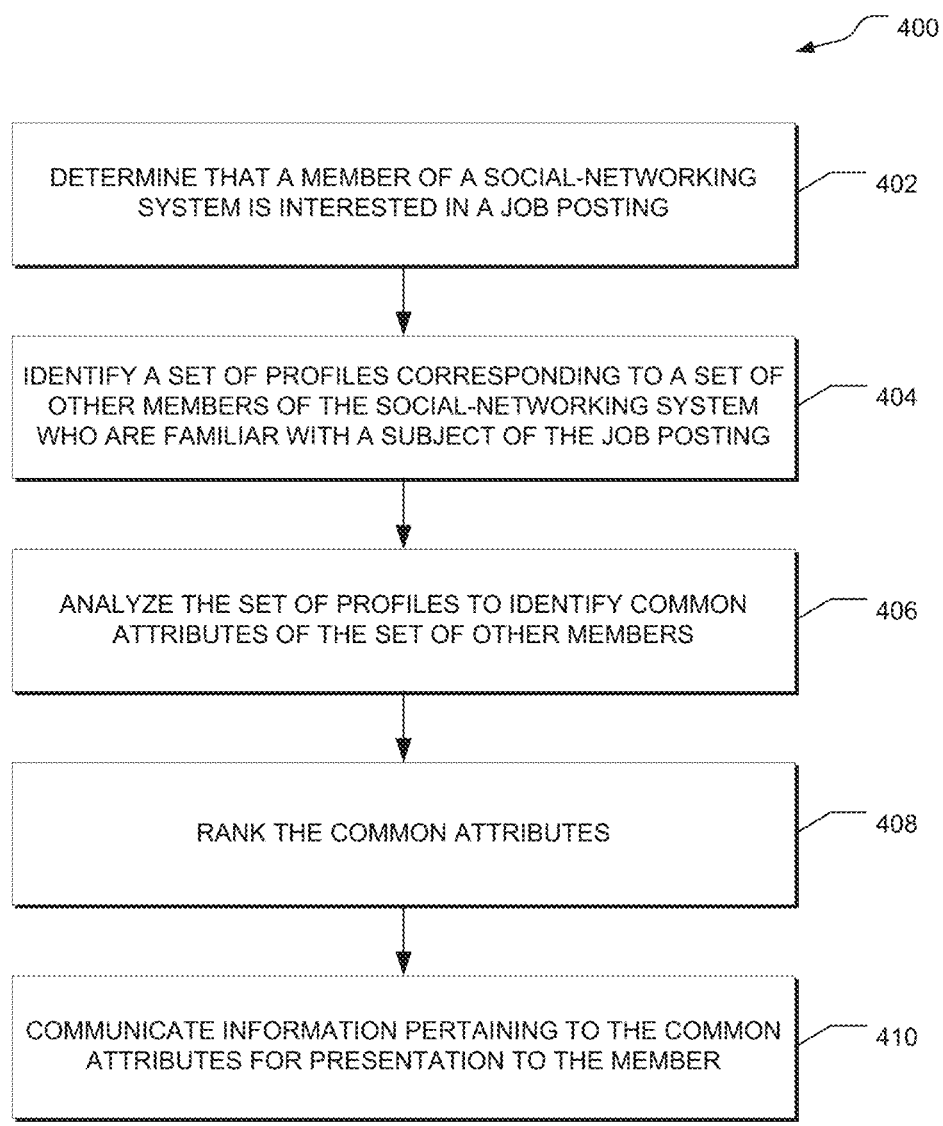
FIG. 4 is a flow chart illustrating example operations of a method of communicating information pertaining to common attributes of a set of members of a social networking system who are familiar with a type of a job for presentation with a job posting.

FIG. 4 is a flow chart illustrating example operations of a method 400 of communicating information pertaining to common attributes of a set of members of a social networking system who are familiar with a type of a job. In various embodiments, the method 400 may be implemented by one or more of the modules of FIG. 2.

At operation 402, the access module 254 may determine that a member of a social-networking system is interested in a type of a job (e.g., as described above with respect to FIG. 4).

At operation 404, the analysis module 256 may identify a set of member profiles corresponding to a set of other members of the social-networking system who are familiar with the job or a similar job. For example, the analysis module 256 may identify the set of member profiles based on information contained in the set of member profiles that indicates that each of the set of other members is currently holding or previously held the job or a similar job. For example, the analysis module may determine that a certain number or percentage of the set of member profiles indicate that the set of members have attributes in common, such as employment histories (e.g., titles of jobs held, years of experience at each job, employers, industries, and so on), education levels (e.g., degrees attained), skills, interests, and so on.

At operation 406, the analysis module 256 may identify common attributes of the set of member profiles. These attributes may include any attributes specified in the member profiles, such as skills, education, experience (e.g., years of experience, job titles held, etc.), and so on.

At operation 408, the analysis module 256 may rank the identified common attributes. The ranking may be based, for example, on a number or percentage of the set of profiles that include the common attribute and a common value for the attribute. Thus, for example, for a "software engineering" type of a job, the selection module may rank skills pertaining to programming languages known (e.g., Java, C++, etc.) as highly relevant based on the analysis of the profiles showing that a certain percentage (e.g., 90%) of the members specify "programming languages known" as having a strong relationship to the job. In another example, the ranking may also be based on how distinctive a particular attribute (e.g., a phrase) of the set of profiles when compared to profiles outside of this set. For example, while not many profiles of members in software engineering job functions may contain "distributed systems" as one of profile attributes, this attribute may be over-represented in profiles of software engineers at a particular company. This would make "distributed systems" a distinctive attribute of a software engineering job at that company. The degree of attribute distinctiveness may be determined using a statistical hypothesis test such as a Chi-squared test, or another similar metric known to those familiar with the art.

At operation 410, the transmission module 262 may communicate information pertaining to the common attributes for presentation to the member. Such information may include attributes identified as being particularly relevant to the job, values of the attributes, rankings of the attributes, and rankings of the values of the attributes. For example, the transmission module 262 may communicate years of experience, education, and skills as being the three most relevant attributes in common to the set of members who are familiar with the job. The transmission module 262 may also communicate a ranking of the particular number of years of experience that are most relevant (e.g., (1) 10 years, (2) 5 years, (3) 2 years, and so on), a ranking of the education levels that are most relevant (e.g., (1) master's degree, (2) bachelor's degree, a ranking of the skills that are most relevant (e.g., programming languages known, computer applications known), and so on. The transmission module 262 may further communicate rankings within each attribute value. For example, the master's degree ranking may include particular degrees (e.g., computer science, physics, business, etc.). And the "programming language known" skill ranking may include particular programming languages (e.g., Java, C++, and so on).

Figure 5:
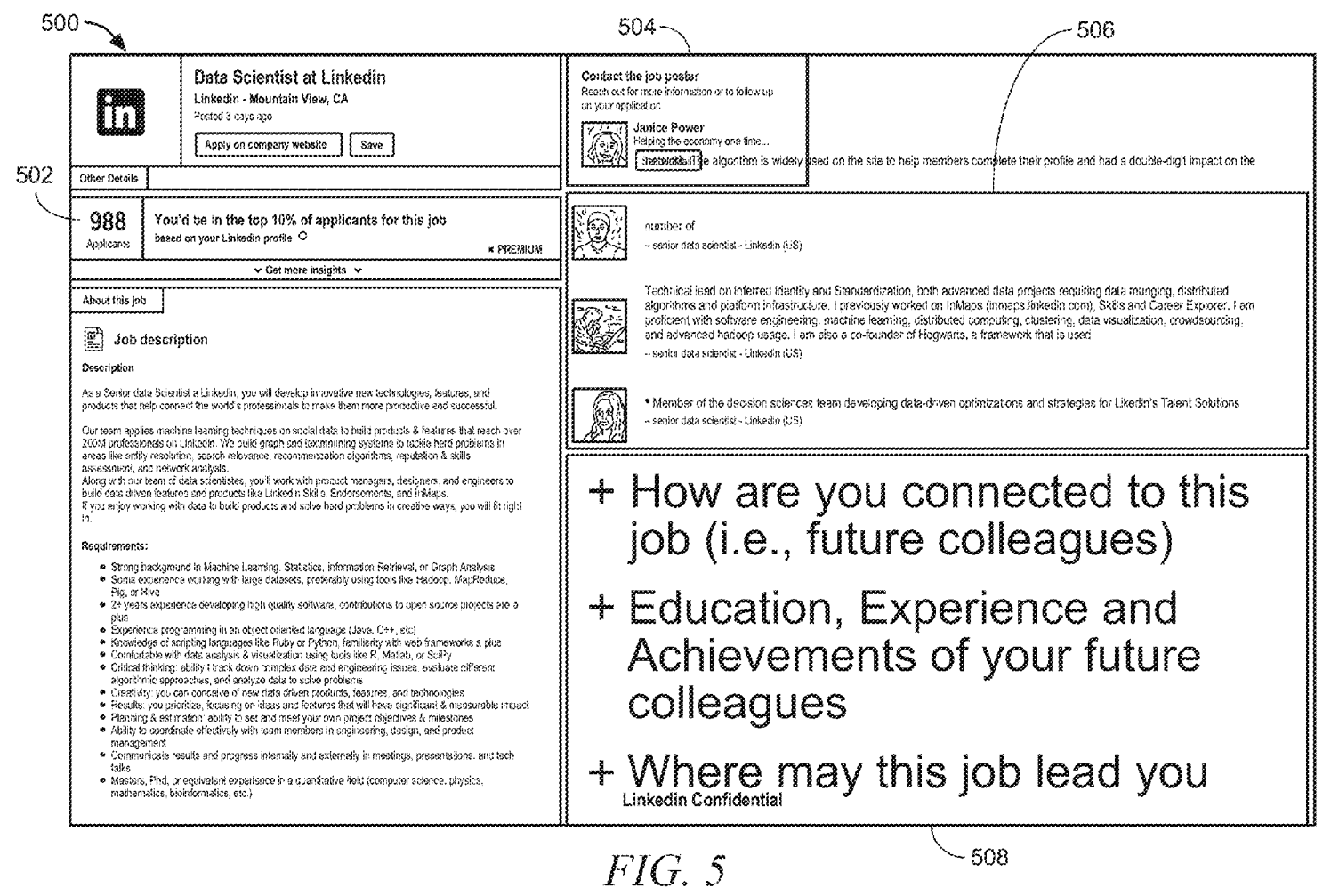

FIG. 5 is a line drawing illustrating an example user interface 500 that may be presented to the member. In various embodiments, the user interface 500 may be presented by a client (e.g., in response to a user clicking on a link pertaining to a job). The user interface 500 may include various regions in which information is displayed. Some of the information may be provided by a job recruiter (e.g., a name of the job, the name of the company who is hiring for the job, how long ago the job was posted, and a description of the job. Other regions may include additional data that is derived from other sources, such as profiles of other members of the social-networking system, or data supplied by the others members in applications submitted for the job.

For example, region 502 may include information pertaining to how the member who is interested in the job compares to other members who have applied for the job (e.g., based on a comparison of the profile of the member with the profiles of the applicants, a comparison of the profile of the member with the requirements of the job as specified in the job posting, or both).

Region 504 may include information pertaining to the person who posted the job description (e.g., a job recruiter at the hiring company), such as the name of the job recruiter, the company employing the job recruiter, a link to a profile of the job recruiter, and so on.

Region 506 may include a listing of keywords or phrases that are most relevant to the job posting (e.g., based on an analysis of profiles of other members of the social-networking system, such as members who are familiar with the job) as well as links to profiles of other members of the system who specified the phrase in their profiles and who are ranked as having profiles that are most relevant to the job (e.g., as described above with respect to FIG. 3 and FIG. 4). In various embodiments, the rankings may also be adjusted based on relationships between the member and the other members. In alternative embodiments, the relationship between the member and the other members is ignored.

Region 508 may include additional information pertaining to the job, such as information about how the profile of the member corresponds to the job. For example, region 508 may indicate how the member connected to other people who hold the job (e.g., through a visual depiction of relationships that the member has with future colleagues), how the member's education, experience, achievements, and skills compares with other people who hold the job, or where this job will lead the member (e.g., a visual depiction of a career path based on career paths of other members who have held the job).

FIG. 6A is a line drawing illustrating an additional example user interface 600 that may be presented to the member. In various embodiments, the user interface 600 may be presented by a client (e.g., in response to a member clicking on a link pertaining to a job). In various embodiments, the user interface 600 may be presented as a region of a user interface that includes other regions (see, e.g., element 506 of FIG. 5).

The user interface 600 includes a "Profile Insights" widget that includes information derived from profiles of members of the social-networking system who currently hold a particular job (e.g., a Program Manager job) at a particular company (e.g., Microsoft). Thus, the level of specificity of the information presented in the user interface 600 may depend on how much is known about the type of job that the member is interested in, such as whether the member has indicated an interest in particular job titles or particular companies.

The information includes a photo of each of the members and at least a portion of information that each of the members posted about the job (e.g., snippet from descriptions of the job specified in the profiles of the members). In various embodiments, the profiles are selected and ranked (e.g., as described above with respect to FIG. 3 and FIG. 4). Thus, the member viewing a job description may be presented with contextual information not included in the job description that may better enable the member to determine whether the job is a good fit for the member.

FIG. 6B is a line drawing illustrating an additional example user interface 650 that may be presented to the user. In various embodiments, the user interface 600 may be presented by a client (e.g., in response to a user clicking on a link pertaining to a job). In various embodiments, the user interface 600 may be presented as a region of a user interface that includes other regions.

In various embodiments, the user interface 600 may include one or more keywords pertaining to the job presented as a word cloud with emphasis placed on keywords according to their relevance to the job. The relevance of the keywords may be determined as described above (e.g., see FIG. 3 and FIG. 4). Thus, the member may be able to quickly determine from the keywords whether a particular job suits the member's background and qualifications. Seeing the most relevant keywords for a particular job may also enable the member to better tailor the member's profile to demonstrate the member's qualifications with respect to the job requirements.

Figure 7:
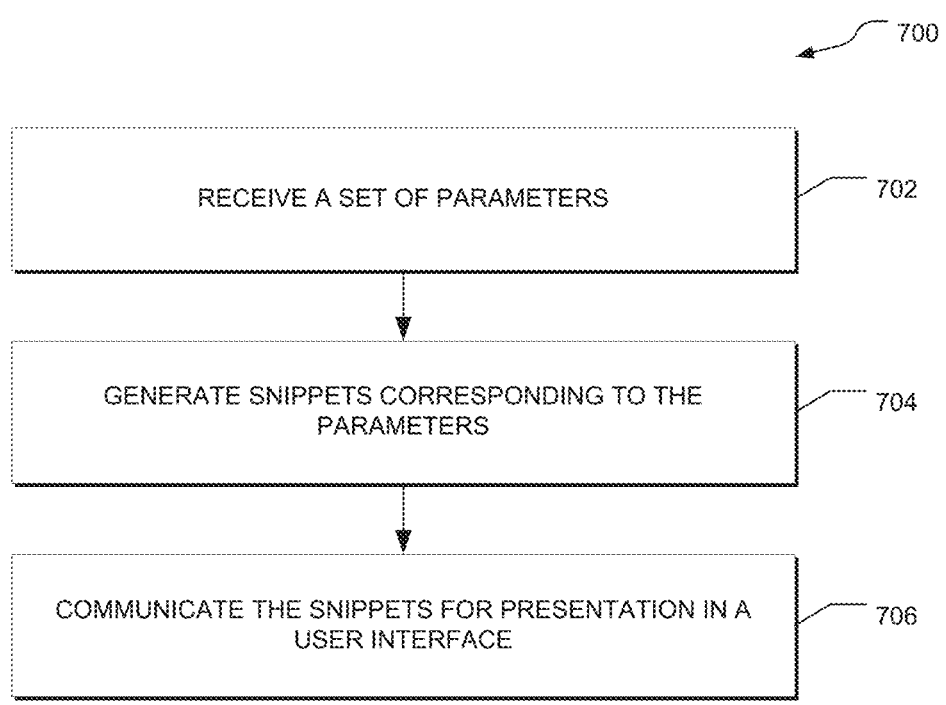
FIG. 7 is a flow chart illustrating example operations of a method of communicating an arbitrary number of snippets for presentation in a user interface.

FIG. 7 is a flow chart illustrating example operations of a method 700 of communicating an arbitrary number of snippets for presentation in a user interface (e.g., in a region of a landing page of a web site). In various embodiments, the method 400 may be implemented by one or more of the modules of FIG. 2.

At operation 702, the reception module 252 receives a set of parameters pertaining to the snippets that are to be generated. The parameters may indicate, for example, that the snippets are to pertain to a particular job title (e.g., "Software Developer"), a particular employer (e.g., "Microsoft"), or a particular location (e.g., "U.S."). In various embodiments, any combination of values corresponding to data fields maintained by the social networking system with respect to member profiles may be specified. Additionally, the parameters may specify particular technology areas or keywords that are of interest. In various embodiments, the parameters may include information pertaining to characteristics of the snippets themselves, such as how many snippets are to be generated, the maximum or average size of each snippet, keywords that are to be emphasized in the snippets, how the snippets are to be ranked or sorted (e.g., keywords that are particular important), how current the snippets are to be (e.g., updated within the last day, week, month, year, and so on).

At operation 704, the analysis module 256 may analyze member profiles to generate snippets corresponding to the parameters. Thus, for example, the analysis module 256 may select portions of a job description provided by the user that are particularly relevant to the specified parameters, such as the portions of the job description that refer to a particular technology area of interest. In various embodiments, the snippets may be selected and ranked as described above with respect FIG. 3 and FIG. 4.

At operation 706, the snippets are communicated for presentation in a user interface. For example, the generated, selected, and ranked snippets may be communicated for presentation in a region of a user interface of a landing page of a web site. Thus, the landing page may receive freshly generated content pertaining to a subject of interest to the audience of the web site, such as what employees of a company are saying about a particular job at the company. In this way, by incorporating fresh content included in the snippets, the landing page may be better optimized for pay-per-click and search-engine optimization purposes.

Figure 8:
FIG. 8 is a line drawing illustrating an additional example user interface in which an arbitrary number of snippets generated according to a set of parameters is presented.

FIG. 8 is a line drawing illustrating an additional example user interface 800 in which an arbitrary number of snippets generated according to a set of parameters is presented. In various embodiments, the user interface 800 may be presented by a client (e.g., in response to a user accessing a landing page of a web site). In various embodiments, the user interface 800 may be presented as a region of a user interface that includes other regions. In this example, the arbitrary number of snippets are communicated for presentation in response to a set of parameters that specified a job title (e.g., "Software Developer"), an employer (e.g., "Microsoft"), and a location (e.g., "U.S."). Thus, each snippet includes information that was specified in a data field of a member profile that corresponds to the job title, employer, and location, such as a job description field. The snippets may not comprise the entire data field of the member profile, but may instead be selected from information in the data field based on the parameters specified, such as the inclusion of particular keywords. Thus, as also illustrated in FIG. 6A, sentences may be taken from paragraphs and snippets may be taken from sentences based on the criteria. The snippets may be ranked (e.g., based on reputation of a member from which the snippets is taken), as described above with respect to FIG. 3 and FIG. 4. The condensed form of the information contained in the data field may then be communicated for presentation in the user interface.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
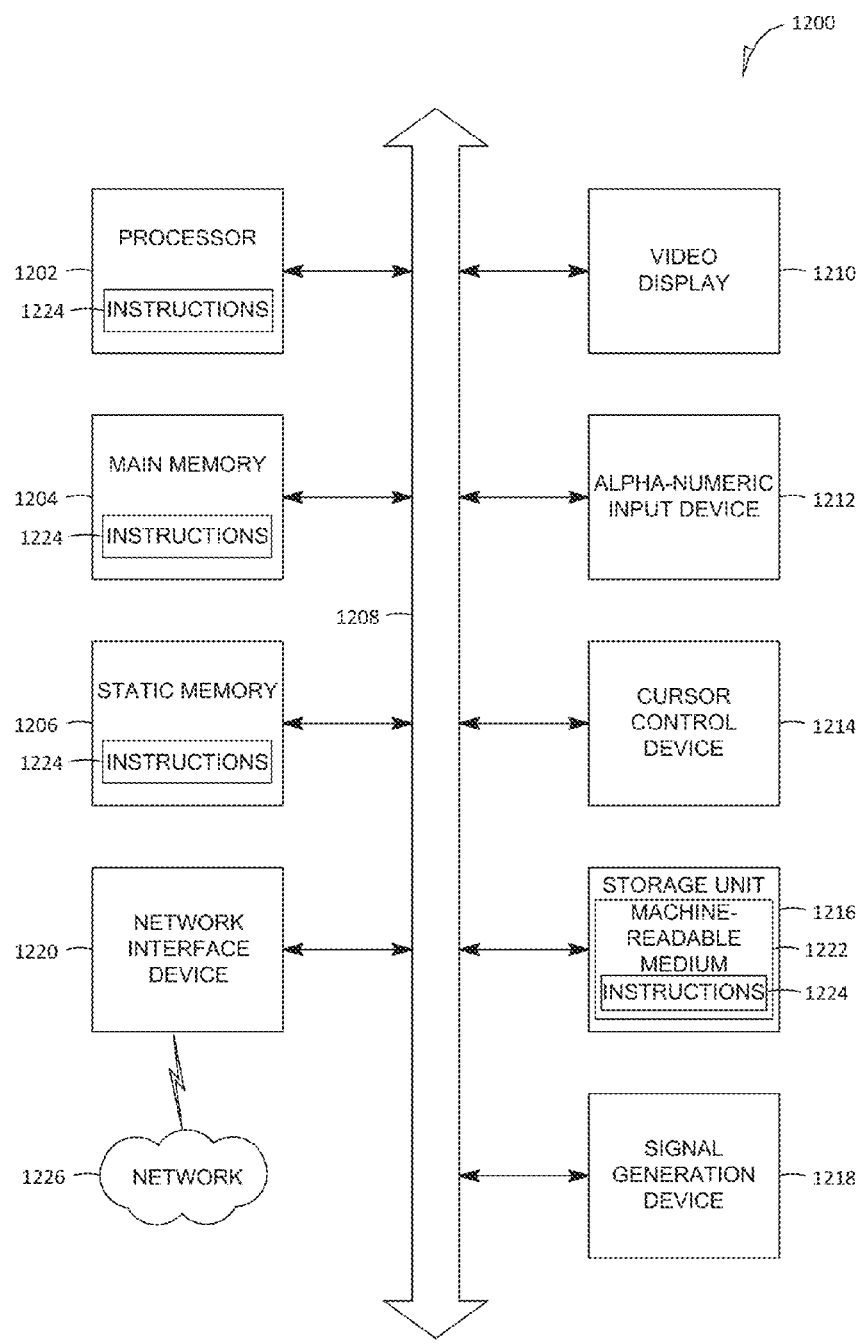
FIG. 9 is a block diagram of a machine in the example form of a computer system within which instructions for causing the machine to perform any one or more of the methodologies discussed herein may be executed.

FIG. 9 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker) and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
incorporating one or more job hosting service modules into one or more computer memories of a social networking service via a computer-implemented deployment process, the one or more job hosting service modules configuring one or more computer processors of the social networking service to perform operations for generating contextual content for inclusion in a region of a user interface of a content page to improve search engine optimization for the content page or to supplement job posting data included in an additional region of the user interface, the operations comprising:
receiving, from a client-computing device, a request for the job posting data;
retrieving the job posting data from a database of the social networking service, the job posting data being for a job opening of an employer, the request associated with a first member of the social networking service;
including the job posting data in the additional region of the user interface;

selecting for presentation with the job posting a snippet of a member profile of a second member of the social networking service, the snippet having been extracted from the member profile based on a strength of a correspondence between information specified in the member profile and information specified in the job posting;

including the snippet in the additional region of the user interface as the contextual information; and responsive to the request, communicating the user interface to the client-computing device for presentation to the first member of the contextual information in conjunction with the job posting data.

2. The method of claim 1, wherein the strength of the correspondence is based on a determination that the second member is currently employed by the employer.

3. The method of claim 2, wherein the strength of the correspondence is based on a length of time that has elapsed since the second member was employed by the employer.

4. The method of claim 1, wherein the selecting of the snippet includes determining that a phrase included in the snippet and pertaining to the job posting data is included in a number of additional member profiles.

5. The method of claim 1, wherein the selecting of the snippet includes determining that a keyword included in the snippet and pertaining to the job posting data is included in a number of additional member profiles.

6. The method of claim 5, further comprising:
determining common attributes specified in additional member profiles of additional members having a strength of correspondence to the job posting data;
ranking the common attributes; and
communicating the common attributes for presentation to the first member.

7. The method of claim 1, wherein the strength of the correspondence is based on a reputation of the second member with respect to an industry corresponding to the job posting data.

8. A system comprising:
one or more computer processors;
one or more computer memories;
one or more job hosting service modules incorporated into the one or more computer memories via a computer-implemented deployment process, the one or more job hosting service modules configuring the one or more computer processors to perform operations for generating contextual content for inclusion in a region of a user interface of a content page to improve search engine optimization for the content page or to supplement job posting data included in an additional region of the user interface, the operations comprising:
receiving from a client-computing device, a request for the job posting data;
retrieving the job posting data from a database of the social networking service, the job posting data being for a job opening of an employer, the request associated with a first member of the social networking service;
including the job posting data in the additional region of the user interface;
selecting for presentation with the job posting a snippet of a member profile of a second member of the social networking service, the snippet having been extracted from the member profile based on a strength of a correspondence between information specified in the member profile and information specified in the job posting;
including the snippet in the additional region of the user interface as the contextual information; and
responsive to the request, communicating the user interface to the client-computing device for presentation to the first member of the contextual information in conjunction with the job posting.

9. The system of claim 8, wherein the strength of the correspondence is based on a determination that the second member is currently employed by the employer.

10. The system of claim 9, wherein the strength of the correspondence is based on a length of time that has elapsed since the second member was employed by the employer.

11. The system of claim 8, wherein the selecting of the snippet includes determining that a phrase included in the snippet and pertaining to the job posting data is included in a number of additional member profiles.

12. The system of claim 8, wherein the selecting of the snippet includes determining that a keyword included in the snippet and pertaining to the job posting data is included in a number of additional member profiles.

13. The system of claim 12, the one or more modules further configured to:
determine common attributes specified in additional member profiles of additional members having a strength of correspondence to the job posting data;
rank the common attributes; and
communicate the common attributes for presentation to the first member.

14. The system of claim 8, wherein the strength of the correspondence is based on a reputation of the second member with respect to an industry corresponding to the job posting data.

15. A non-transitory computer readable medium, the computer readable medium not including a transitory propagating signal, the computer readable medium embodying a set of instructions that, when executed by a processor, cause the processor to perform operations for generating contextual content for inclusion in a region of a user interface of a content page to improve search engine optimization for the content page or to supplement job posting data included in an additional region of the user interface, the operations comprising:
receiving, from a client-computing device, a request for the job posting data:
retrieving the job posting data from a database of the social networking service, the job posting data being for a job opening of an employer, the request associated with a first member of the social networking service;
including the job posting data in the additional region of the user interface;
selecting for presentation with the job posting a snippet of a member profile of a second member of the social networking service, the snippet having been extracted from the member profile based on a strength of a correspondence between information specified in the member profile and information specified in the job posting;
including the snippet in the additional region of the user interface as the contextual information; and
responsive to the request, communicating the user interface to the client-computing device for presentation to the first member of the contextual information in conjunction with the job posting data.

16. The non-transitory computer readable medium of claim 15, wherein the strength of the correspondence is based on a determination that the second member is currently employed by the employer.

17. The non-transitory computer readable medium of claim 16, wherein the strength of the correspondence is based on a length of time that has elapsed since the second member was employed by the employer.

18. The non-transitory computer readable medium of claim 15, wherein the selecting of the snippet includes determining that a phrase included in the snippet and pertaining to the job posting data is included in a number of additional member profiles.

19. The non-transitory computer readable medium of claim 15, wherein the selecting of the snippet includes determining that a keyword included in the snippet and pertaining to the job posting data is included in a number of additional member profiles.

20. The non-transitory computer readable medium of claim 15, the operations further comprising:
   determining common attributes specified in additional member profiles of additional members having a strength of correspondence to the job posting data;
   ranking the common attributes; and
   communicating the common attributes for presentation to the first member.

* * * * *

UNITED STATES PATENT AND TRADEMARK OFFICE
CERTIFICATE OF CORRECTION

PATENT NO. : 9,946,994 B2
APPLICATION NO. : 14/485583
DATED : April 17, 2018
INVENTOR(S) : Singh et al.

Page 1 of 1

It is certified that error appears in the above-identified patent and that said Letters Patent is hereby corrected as shown below:

In the Claims

In Column 15, Line 53, in Claim 8, delete "receiving" and insert --receiving,-- therefor Signed and Sealed this
Thirteenth Day of August, 2019

Andrei Iancu
*Director of the United States Patent and Trademark Office*